(12) United States Patent
Brueggemann et al.

(10) Patent No.: US 8,386,443 B2
(45) Date of Patent: Feb. 26, 2013

(54) REPRESENTING AND STORING AN OPTIMIZED FILE SYSTEM USING A SYSTEM OF SYMLINKS, HARDLINKS AND FILE ARCHIVES

(75) Inventors: Eric Brueggemann, Cupertino, CA (US); Goutham Rao, San Jose, CA (US); Mark Taylor, San Jose, CA (US); Murali Bashyam, Fremont, CA (US); Hui Huang, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 12/573,690

(22) Filed: Oct. 5, 2009

(65) Prior Publication Data

US 2010/0094813 A1 Apr. 15, 2010

Related U.S. Application Data

(60) Provisional application No. 61/103,188, filed on Oct. 6, 2008.

(51) Int. Cl.
*G06F 7/00* (2006.01)
*G06F 17/00* (2006.01)

(52) U.S. Cl. ........................... 707/692; 707/609
(58) Field of Classification Search .......... None
See application file for complete search history.

(56) References Cited

U.S. PATENT DOCUMENTS

| | | | | |
|---|---|---|---|---|
| 5,655,134 A * | 8/1997 | Yamazaki | | 712/1 |
| 5,732,265 A * | 3/1998 | Dewitt et al. | | 1/1 |
| 5,832,527 A * | 11/1998 | Kawaguchi | | 1/1 |
| 6,327,703 B1 * | 12/2001 | O'Donnell et al. | | 717/162 |
| 6,477,510 B1 * | 11/2002 | Johnson | | 705/30 |
| 7,870,105 B2 * | 1/2011 | Arakawa et al. | | 707/692 |
| 2002/0073061 A1 * | 6/2002 | Collins | | 707/1 |
| 2003/0110190 A1 * | 6/2003 | Achiwa et al. | | 707/203 |
| 2005/0193397 A1 * | 9/2005 | Corenthin et al. | | 719/328 |
| 2006/0184673 A1 * | 8/2006 | Liebman | | 709/225 |
| 2007/0152852 A1 * | 7/2007 | Suzuki et al. | | 341/50 |
| 2008/0256242 A1 * | 10/2008 | Liebman | | 709/226 |
| 2009/0063899 A1 * | 3/2009 | Jordan et al. | | 714/17 |
| 2009/0216788 A1 * | 8/2009 | Rao et al. | | 707/101 |
| 2009/0271412 A1 * | 10/2009 | Lacapra et al. | | 707/10 |
| 2009/0282162 A1 * | 11/2009 | Mehrotra et al. | | 709/233 |
| 2010/0094806 A1 * | 4/2010 | Apostolides et al. | | 707/637 |
| 2010/0106687 A1 * | 4/2010 | Marcy et al. | | 707/622 |
| 2011/0107274 A1 * | 5/2011 | Carlson et al. | | 715/855 |
| 2011/0125818 A1 * | 5/2011 | Liebman | | 707/829 |
| 2011/0196848 A1 * | 8/2011 | Anglin | | 707/692 |

OTHER PUBLICATIONS

Sparkane, "Windows Symbolic and Hard Links", [Online]. Retrieved from the Internet: <ftp://vcs2.newcastle.edu.au/Useful_Software/File_and_directory_software/Symbolic_link_progs/_%20Shell-Shocked%20_%20Windows%20Symbolic%20and%20Hard%20Links.pdf>,(Accessed May 23, 2012)21 pgs.
Slonka, Kevin J., "Symbolic and Hard Links Explained", [Online]. Retrieved from the Internet: <http://www.kevinslonka.com/files/20080918-Symbolic-and-Hard-Links-Explained.pdf>,(Sep. 18, 2008),8 pgs.

* cited by examiner

*Primary Examiner* — Charles Kim
*Assistant Examiner* — Jessica N Le
(74) *Attorney, Agent, or Firm* — Kwan & Olynick LLP (57) ABSTRACT

A data de-duplication system is used with network attached storage and serves to reduce data duplication and file storage costs. Techniques utilizing both symlinks and hardlinks ensure efficient deletion file/data cleanup and avoid data loss in the event of crashes.

12 Claims, 11 Drawing Sheets

Figure 1

| Metadata Database 201 | | | | | |
|---|---|---|---|---|---|
| Identifier 211 | Access Time 213 | Metadata 215 | | | |
| | | Name 221 | Create Time 223 | Size 225 | Ownership 227 | Group Ownership 229 |
| Metadata Database Entry 231 | | | | | |
| Metadata Database Entry 233 | | | | | |
| Metadata Database Entry 235 | | | | | |

| Optimized Multiple File Preamble 401 | |||||
|---|---|---|---|---|---|
| Next Index 411 |||  Next Offset 413 |||
| Data Offset 421 ||| Data Length 423 |||
| Data Offset 425 ||| Data Length 427 |||
| Data Offset 429 ||| Data Length 431 |||
| 1 | Metadata 433 | 1 | Metadata 435 || 1 |
| 1 | Metadata 437 | 1 | Metadata 439 || 1 |
| 1 | Metadata 443 | 1 | Metadata 445 || 1 |
| Compressed Data 451 |||||
| Compressed Data 453 |||||
| Compressed Data 455 |||||

REPRESENTING AND STORING AN OPTIMIZED FILE SYSTEM USING A SYSTEM OF SYMLINKS, HARDLINKS AND FILE ARCHIVES

CROSS-REFERENCE TO RELATED APPLICATIONS

This application claims the benefit of U.S. Provisional Patent Application No. 61/103,188, filed Oct. 6, 2008 entitled "REPRESENTING AND STORING AN OPTIMIZED FILE SYSTEM USING A SYSTEM OF SYMLINKS, HARDLINKS AND FILE ARCHIVES" to Eric Brueggemann, Goutham Rao, Mark Taylor, Murali Bashyam and Hui Huang. This application is incorporated in its entirety by reference as if fully set forth herein.

BACKGROUND OF THE INVENTION

The present disclosure relates to file optimization, and the associated computing hardware. In some examples, the techniques of the present disclosure provide an architecture for multiple file compaction in a network attached storage system.

Network attached storage (NAS) provides application servers the ability to store and access files on file servers over a network. Like direct attached storage and unlike block based storage area networks (SANs), NAS is a file based system that offloads file management operations from application servers to file servers. The file servers themselves may include hard drives, redundant arrays of independent disks (RAIDs), and may be connected to tape drives and tape emulators. File servers are connected to application servers using protocols such as Network File System (NFS), Server Message Block (SMB), etc.

NAS provides a robust mechanism for storing and managing large amounts of data. However, maintaining vast amounts of data is expensive not just in terms of the physical hardware costs, but also in terms of system administration and infrastructure costs. Some mechanisms allow compression of data to save on resources. For example, some file formats such as the Portable Document Format (PDF) are already compressed. Some other utilities allow compression on an individual file level in a relatively inefficient manner. Still other mechanisms allow for more efficient tape backup of data. Instead of backing up all data repeatedly, mechanisms are provided to select changed blocks of data for backup.

However, existing mechanisms for maintaining and managing large amounts of data have a variety of drawbacks and limitations. Consequently, the techniques and mechanisms of the present invention provide improved mechanisms to efficiently optimize files.

SUMMARY OF THE INVENTION

Mechanisms are provided for optimizing multiple files in an efficient format that allows maintenance of the original namespace. Multiple files and associated metadata are written to a suitcase file. The suitcase file includes index information for accessing compressed data associated with compacted files. For each compacted file, a symlink is created whose data section encodes the location of the suitcase file and an index number used to access the appropriate index information. The symlink maintains the same file name of the particular file prior to compaction.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION OF THE PREFERRED EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In a network attached storage (NAS) system, application servers are connected to file servers over a network. The file servers provide application servers with access to storage through a network file system. The storage provided by the file servers can generally be classified into online and offline storage. Online storage includes direct attached storage (DAS) and storage area networks (SANs) that provide relatively fast read and write access mechanisms. Offline storage includes tape devices and virtual tape devices that tend to have more methodical read and write access mechanisms. In some instances, read and write access to offline storage must occur in flock based sequential order.

File servers provide both online storage and offline storage. Users associated with application servers can make file level calls to access data associated with file servers, in many instances, the amount of data managed by file servers is substantial, and costs associated with storing and accessing the data is significant. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data. In many instances, deduplication looks within a file and saves unique iterations of each block or bit.

Each chunk of data is processed using a hash algorithm such as MD5 or SHA-1. This process generates a unique number for each piece which is then stored in an index. If a file is updated, only the changed data is saved. That is, if only a few bytes of a document or presentation are changed, only changed portions are saved. In some instances, deduplication searches for matching sequences using a fixed or sliding window and uses references to matching sequences instead of storing the matching sequences again.

However, searching for matching sequences using fixed or sliding windows still does not necessarily provide highly efficient file optimization results. It is often difficult or impossible to determine a proper sequence size for evaluating matches. An efficient size for one application may be very inefficient for another application. Furthermore, implementing a data deduplication system can be disruptive.

Consequently, the techniques and mechanisms of the present invention provide mechanisms for more efficiently allowing optimization of data in a NAS system. An existing network file system and name space is maintained while adding the ability to seamlessly integrate file optimization into a NAS. According to various embodiments, an optimization tool can aggressively compress and compact files based on characteristics of particular files and file types as well as based on characteristics across multiple files. According to various embodiments, any processed file that may be smaller, more efficiently read and transmitted, and/or more effectively stored than a non-processed file is referred to herein as an optimized file, Any individual file that is processed to increase the storage efficiency of the file is referred to herein as a compressed file. Any file associated with a group of files that are processed to increase the storage efficiency of the group of files is referred to herein as a compacted file. That is, instead of simply optimizing a single file, multiple files can be optimized efficiently.

However, it is recognized that performing optimization across files poses distinct challenges. The techniques and mechanisms of the present invention recognize that when a file is optimized, either with compression or compaction, some of the original metadata for a file is changed. Metadata may include file size, the time a file was last accessed, file ownership, group associations, address information, thumbnails, etc. In order for optimization on a file server to remain transparent to application servers, the original metadata needs to be maintained and returned when an application requests the file metadata.

According to various embodiments, the compacted files are combined and maintained in a suitcase file. The suitcase file includes compressed data for each of the compacted files as well as metadata corresponding to precompacted versions of the files. Index information is included in the suitcase file to allow access and modification of the suitcase file. A specially encoded symlink represents a precompacted file and includes an index number to allow retrieval of index information for accessing corresponding compressed data. This symlink maintains the same name of the precompacted version of a file and presents a consistent view of the file system to an application.

Figure 1:
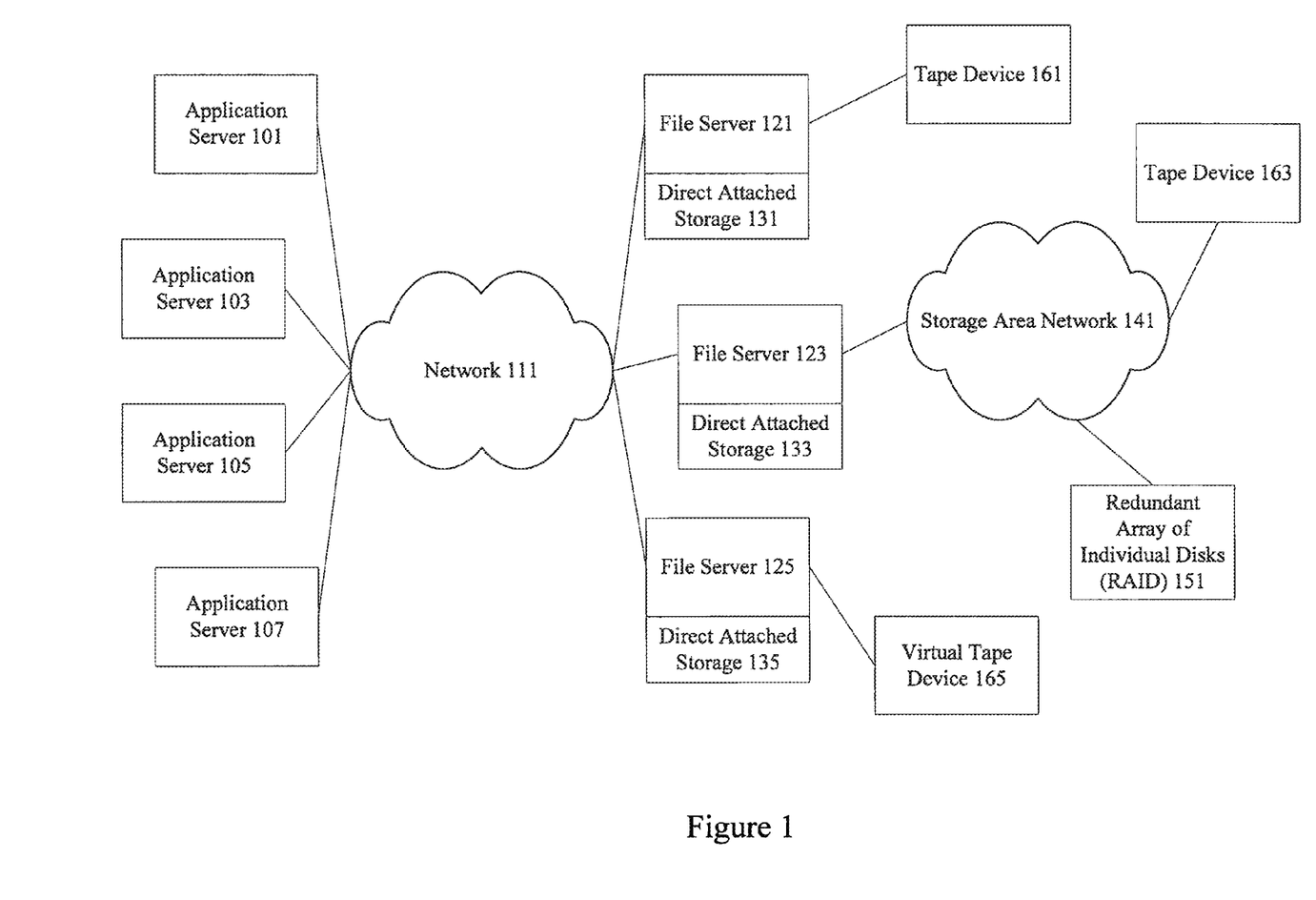
FIG. 1 illustrates a particular example of a network that can use the techniques and mechanisms of the present invention.

FIG. 1 illustrates a particular example of a network that can use the techniques and mechanisms of the present invention. Applications servers 101, 103, 105, and 107 are connected to file servers 121, 123, and 125 through a network 111. A network 111 may be a single network or a combination of different networks. According to various embodiments, each application server 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, applications servers 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow application servers 101, 103, 105, and 107 to access data at the file level. The file servers 121, 123, and 125 then use block level protocols such as serial advanced technology attachment (SATA), Internet Small Computer Systems Interface (iSCSI), and storage area networks (SANS) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a file area metadata service may be implemented at application servers 101, 103, 105, and 107, at network 111, or at file servers 121, 123, and 125 or at a combination of entities. A computing entity with such a service is referred to as a file or data optimizer or simply an optimizer. An embodiment of an optimizer contains multiple multi core processors and various types of random access and mass storage memories. The file area metadata service intercepts client request and responds to the client request with a response expected by the client. For example, if a client associated with application server 101 requests the size of a particular file, the size of the particular file in non optimized form is provided in the response even though the particular file may now have a different size because of compression amid/or compaction. In particular examples, the file area metadata service may intercept the request at an application server 101, at a switch in a network 111, or at a file server 121 and respond with the appropriate metadata. The namespace can continue to be maintained by the file system.

Figure 2:
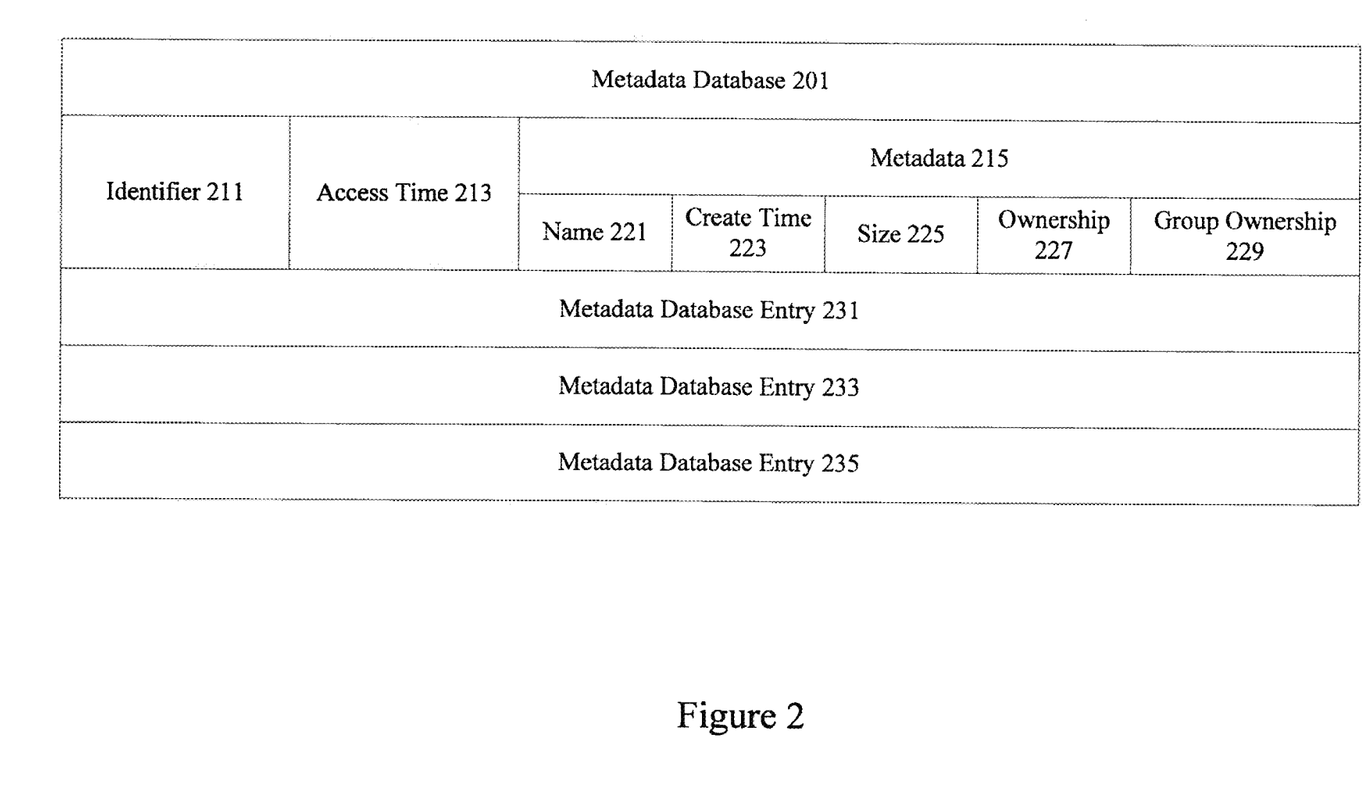
FIG. 2 illustrates a particular example of a metadata database.

FIG. 2 is illustrates a particular example of a metadata database. Many file systems keep file metadata out-of-band. Some systems keep metadata in directory entries. Others keep metadata in specialized structures like inodes or even in the name of a file. Metadata can range from simple timestamps, mode bits, and other special-purpose information used by the implementation itself, to icons and free-text comments, to arbitrary attribute-value pairs.

The techniques and mechanisms of the present invention contemplate a metadata database 201 having metadata database entries 231, 233, and 235. According to various embodiments, each entry includes an identifier 211, an access time 213, and metadata 215. In particular examples, metadata 215 includes name 221, create time 223, size 225, ownership 227, and group ownership 229. According to various embodiments, the identifier 211 is a unique identifier such as an inode number associated with a file. The inode number of a file can be used as a lookup key as the inode number does not change during the lifetime of a file. A variety of time stamps can be used to allow post-retrieval validation. According to various embodiments, timestamps in a metadata database are compared with timestamps in a corresponding file. The comparison avoids possible misuse of stale metadata database entries for a recently restored file.

Figure 3:
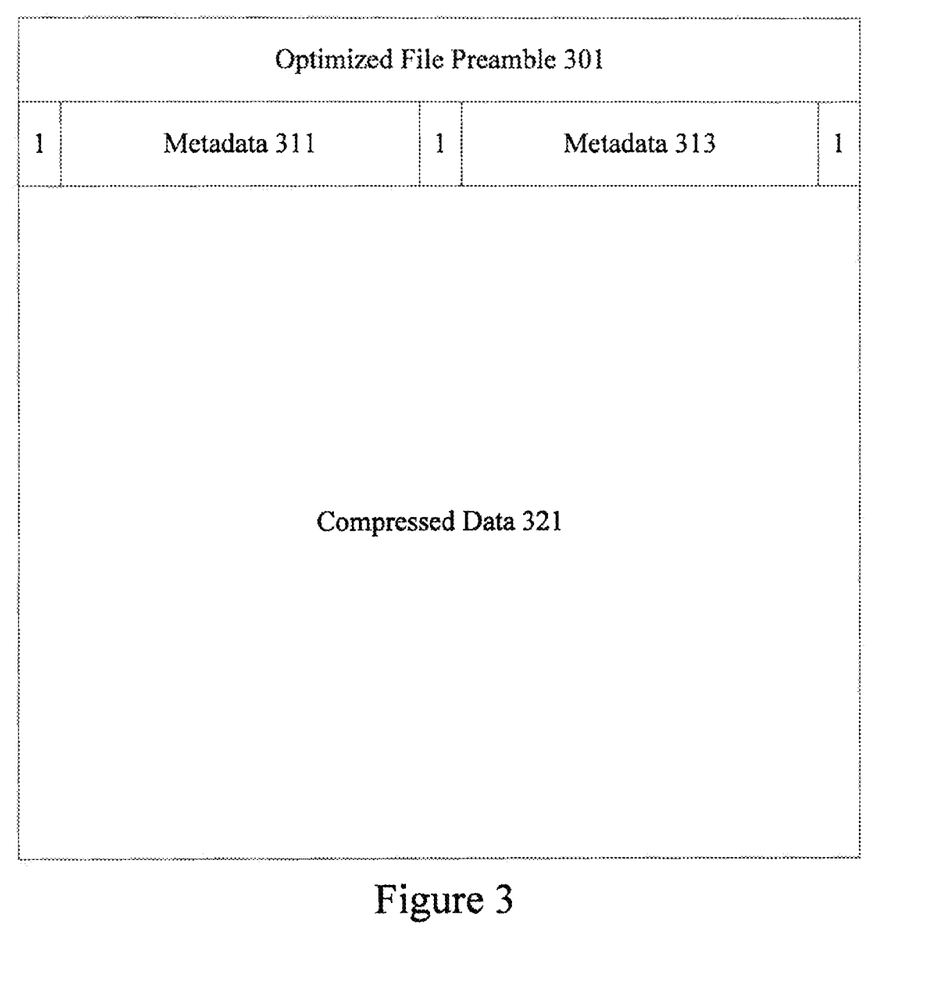
FIG. 3 illustrates a particular example of a compressed file.

FIG. 3 illustrates one example of an optimized file. The optimized file includes an optimized file preamble 301. The optimized file also includes compressed data 321. According to various embodiments, metadata is written twice as metadata 311 and metadata 313. Individual bits surround metadata fields 311 and 313. In particular examples, if the bits surrounding a particular metadata entry have not been written, the metadata entry is not considered to be committed. Using bits surrounding the metadata provides a semblance of an atomic operation. If all bits are written, the metadata 311 and 313 can be considered accurately written, if some surrounding bits are not yet written, the metadata may be considered as not yet committed. According to various embodiments, metadata 311 and metadata 313 is configured to be a block size that can be atomically written by a hard drive.

In particular examples, all operations are designed such that, should a crash occur at any point, there is no loss or corruption of data. However, there can be stale files or database entries left behind. Attempting to eliminate this possibility is a very complex problem which dictates the need for transactional semantics across multiple file system and database operations. Since the situation arises only when a poorly-timed failure occurs, and results only in additional space usage, the entire design is not burdened with excess complexity. According to various embodiments, a periodic garbage collection routine is used to discover and clean up any unnecessary files or database entries.

It should be noted that namespace information continues to be maintained by the file system and need not to be stored in any compressed file.

Figure 4:
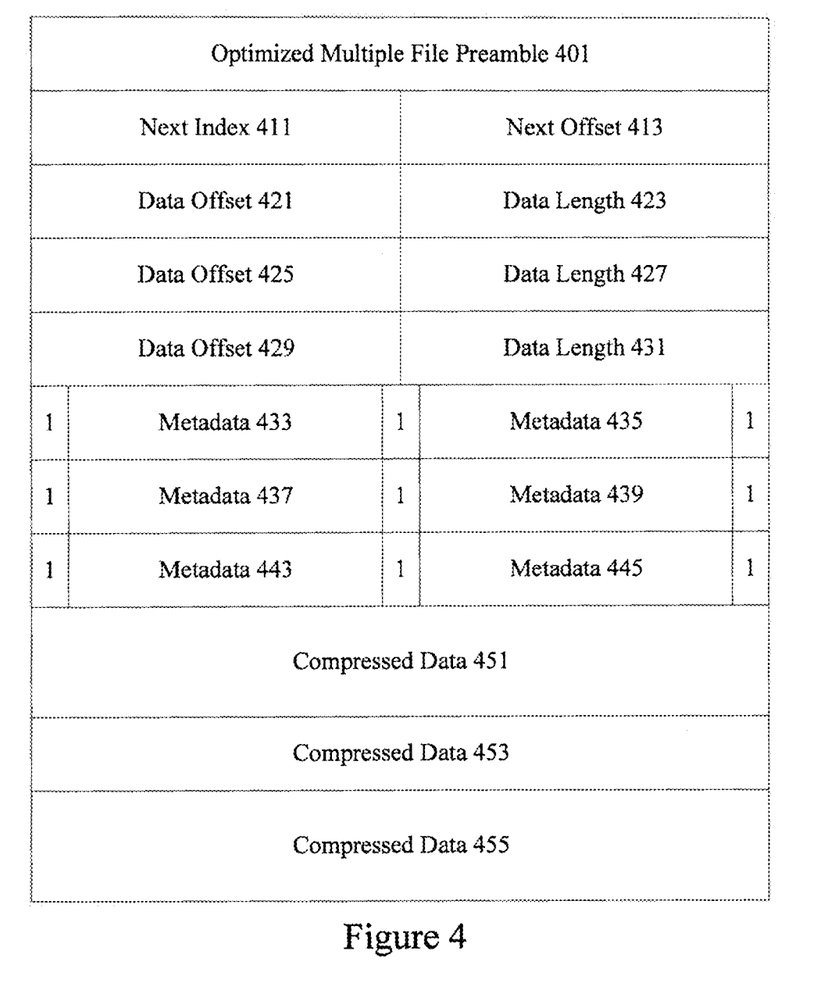
FIG. 4 illustrates a particular example of a compacted file.

FIG. 4 illustrates another example of an optimized file. According to various embodiments, the optimized files may be compacted files having information obtained from multiple files or all files in a directory. The techniques of the present invention recognize that data can be more efficiently optimized when multiple files instead of individual files are evaluated for optimization. Patterns and characteristics across files and file types can be analyzed to allow for more efficient compression, storage, and retrieval. An optimized file includes an optimized multiple file preamble 401. The preamble 401 provides some kind of uniqueness to the file. An optimized file including multiple compressed files is also referred to herein as a suitcase file. In some instances, a suitcase file may include all files in a particular directory.

The optimized file includes a next index 411 and a next offset 413 that can be used for adding and deleting compressed and/or compacted data. Data offsets 421, 425, and 429 along with data lengths 423, 427, and 431 are used to determine positions of compressed data 451, 453, and 455. Metadata 433, 437, and 443 are redundantly written as metadata 435, 439, and 445. Commit bits surround metadata 433, 435, 437, 439, 443, and 445. In particular examples, if the bits surrounding a particular metadata entry have not been written, the metadata entry is not considered to be committed. Using bits surrounding the metadata provides a semblance of an atomic operation. If all bits are written, the metadata can be considered accurately written. If some surrounding bits are not yet written, the metadata may be considered as not yet committed. According to various embodiments, metadata is configured to be a block size that can be atomically written by a hard drive.

According to various embodiments, to add an additional file to a suitcase file, an additional data offset and data length field is introduced along with an additional redundant written metadata field. The compressed data itself is added using the data offset and data length introduced. Both compressed and compacted files can be created with relative ease using the optimized file formats shown in FIGS. 3 and 4.

Figure 5:
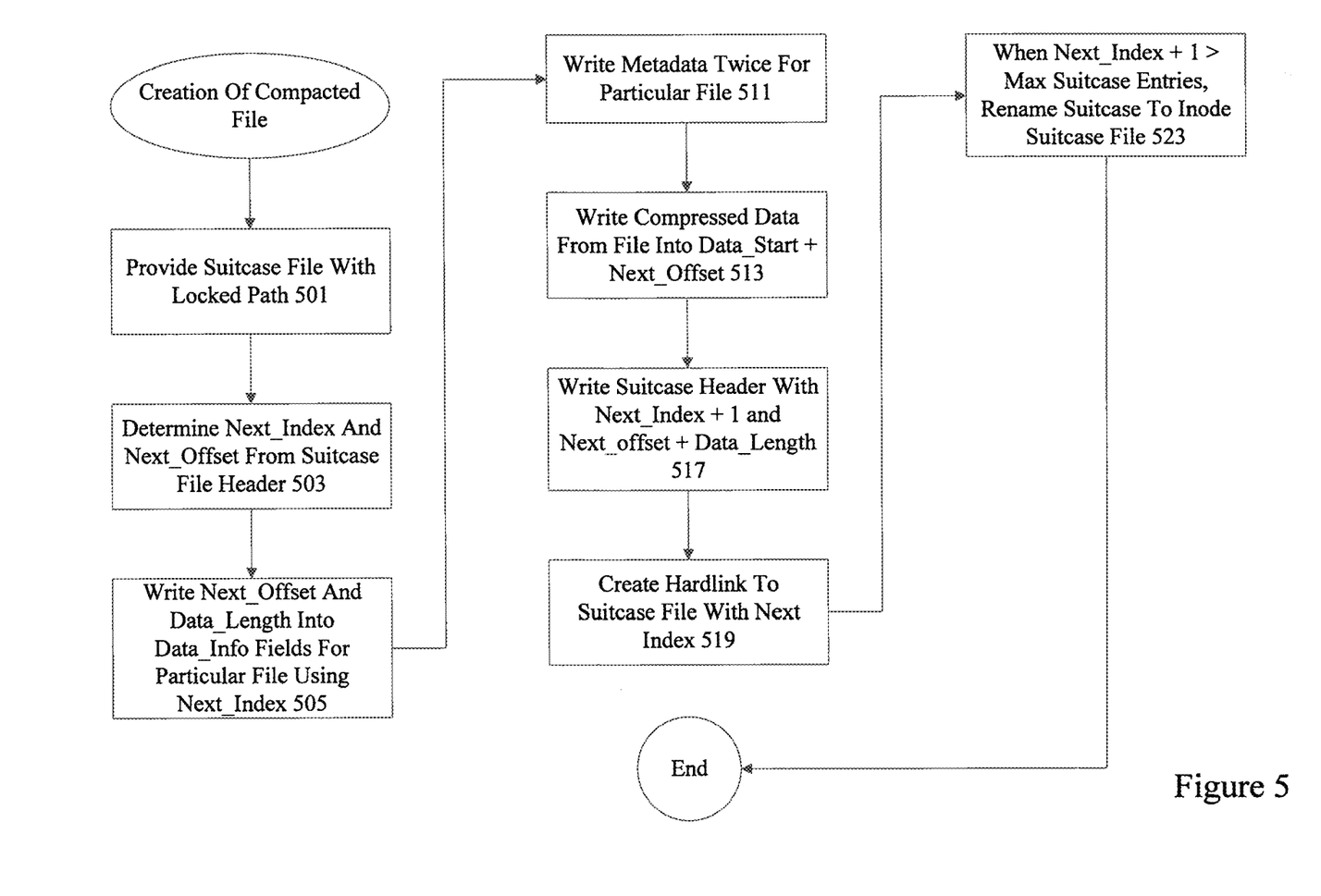
FIG. 5 illustrates a particular example of compacted file creation.

FIG. 5 illustrates one example of compacted file creation. At 501, a suitcase file with a locked path is provided. According to various embodiments, the suitcase file path is locked and the suitcase file itself is opened. If the suitcase file does not exist, a file such as sc.ofs is created. In particular examples, only one active suitcase file is permitted per directory. At 503, the next_index and next_offset are determined from the suitcase file. At 505, the next_offset and data_length fields are written into the data_length and data_info fields for a particular file at the next_index 505 value. At 511, the metadata is written twice for a particular file. At 513, the compressed data from the file is written into the data_start+next_offset position. In some instances, the data from the file may already be compressed or compacted. At 517, a suitcase header is written with next_index+1 and next_offset+data_length.

According to various embodiments, a hard link is created for the suitcase file with filename.<next_index>.ofs at 519. In particular examples, the filename is used to provide uniqueness within the directory. The filename also allows a garbage collector to check that the hard link remains active. A simulated link (symlink) can be associated with an index file name. In this manner, client applications continue to have a consistent view of data files. Symlink files correspond to client application maintained file names. The file name includes an encoded file index for accessing the appropriate metadata and compressed data corresponding to a particular file. In this manner, a client can access metadata and compressed data in a suitcase file while maintaining use of an original file name.

When the next_index+1 reaches a maximum at 523, the suitcase file is renamed to <inode>.sc.ofs. The rename prevents adding new entries into the suitcase file. In particular examples, the inode name guarantees uniqueness within the resource point and, hence, directory. The rename also allows a garbage collector to easily unlink the suitcase once the link count reaches one. The suitcase path can then be unlocked.

FIG. 5 illustrates one example of compacted file creation. At 501, a suitcase file with a locked path is provided. According to various embodiments, the suitcase file path is locked and the suitcase file itself is opened. If the suitcase file does not exist, a file such as sc.ofs is created. In particular examples, only one active suitcase file is permitted per directory. At 503, the next_index and next_offset are determined from the suitcase file. At 505, the next_offset and data_length fields are written into the data_length and data_info fields for a particular file at the next_index 505 value. At 511, the metadata is written twice for a particular file. At 513, the compressed data from the file is written into the data_start+next_offset position. In some instances, the data from the file may already be compressed or compacted. At 517, a suitcase header is written with next_index+1 and next_offset+data_length.

According to various embodiments, a hard link is created for the suitcase file with filename.<next_index>.ofs at 519. In particular examples, the filename is used to provide uniqueness within the directory. The filename also allows a garbage collector to check that the hard link remains active. A simulated link (symlink) can be associated with an index file name. In this manner, client applications continue to have a consistent view of data files. Symlink files correspond to client application maintained file names. The file name includes an encoded file index for accessing the appropriate metadata and compressed data corresponding to a particular file. In this manner, a client can access metadata and compressed data in a suitcase file while maintaining use of an original file name.

When the next_index+1 reaches a maximum at 523, the suitcase file is renamed to <inode>.sc.ofs. The rename prevents adding new entries into the suitcase file. In particular examples, the mode name guarantees uniqueness within the resource point and, hence, directory. The rename also allows a garbage collector to easily unlink the suitcase once the link count reaches one. The suitcase path can then be unlocked.

Rapid Identification of Deleted Files in the Optimized Environment

When a file is deleted, it is expected that the space the file occupied will be freed and returned to the free block pool. As the system has replaced the original file with a symlink and has stored the data in a suitcase which contains data for multiple files, the system comprises a mechanism for properly handling deletes. The mechanism has the following characteristics:

1. Allows one writer to a suitcase;
2. No performance impact on the delete operation; and
3. Quickly frees the storage from the delete operation.

The above is accomplished in part with a single node cleaner/crawler of the optimizer which asynchronously frees space after the delete operation completes by using hardlinks as a means to identify if a user visible file has been deleted.

Figure 6A:
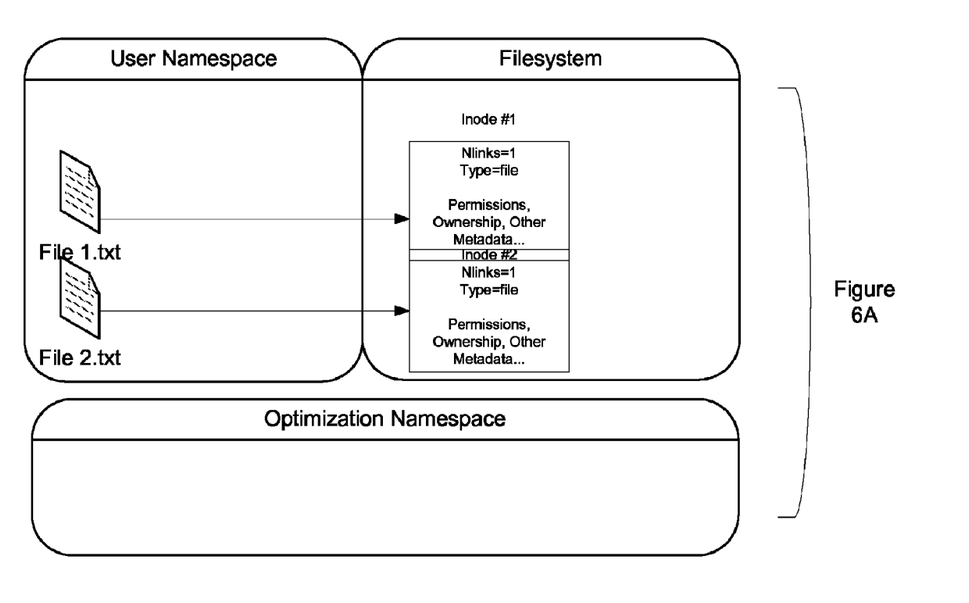
FIGS. 6A-6E illustrate particular graphical representations of suitcase creation and file delete.
Figure 6B:
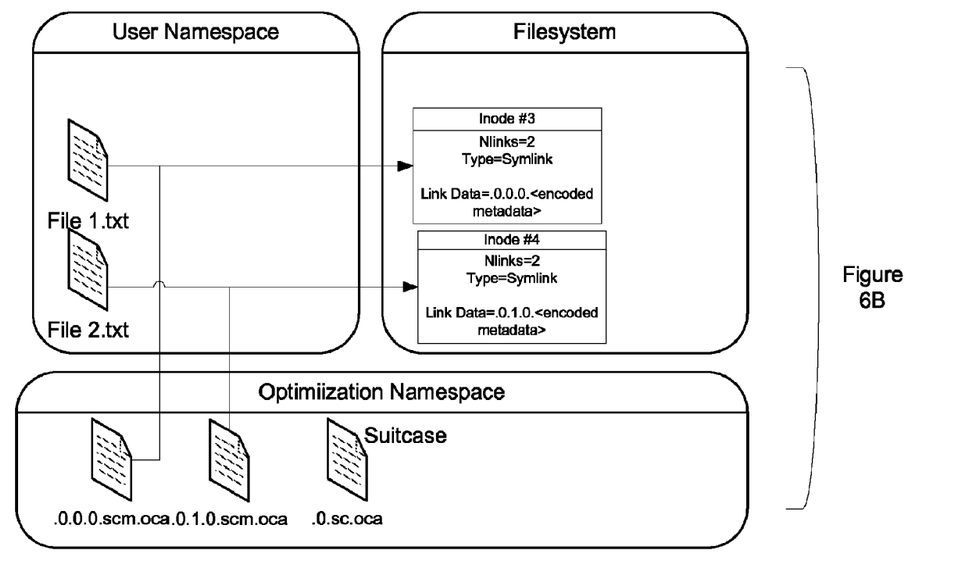
Figure 6C:
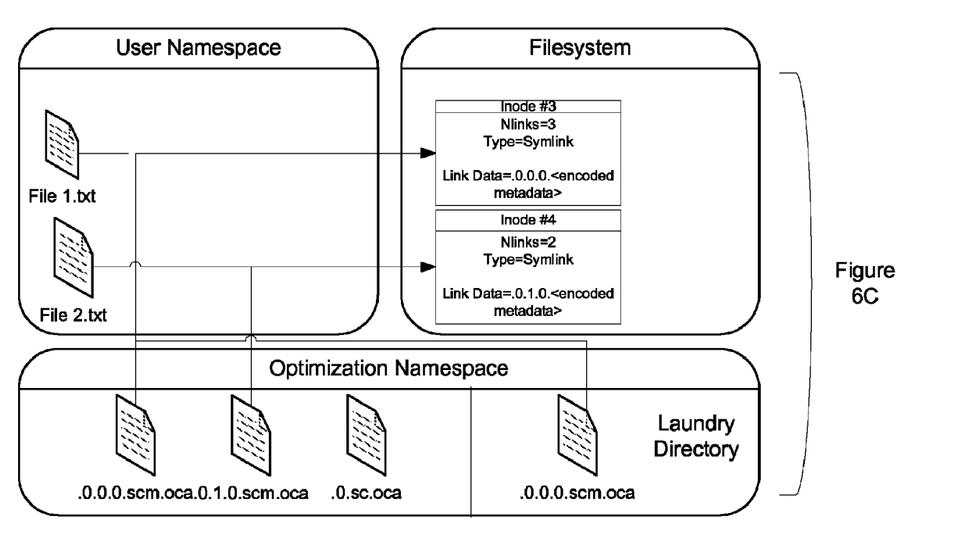
Figure 6D:
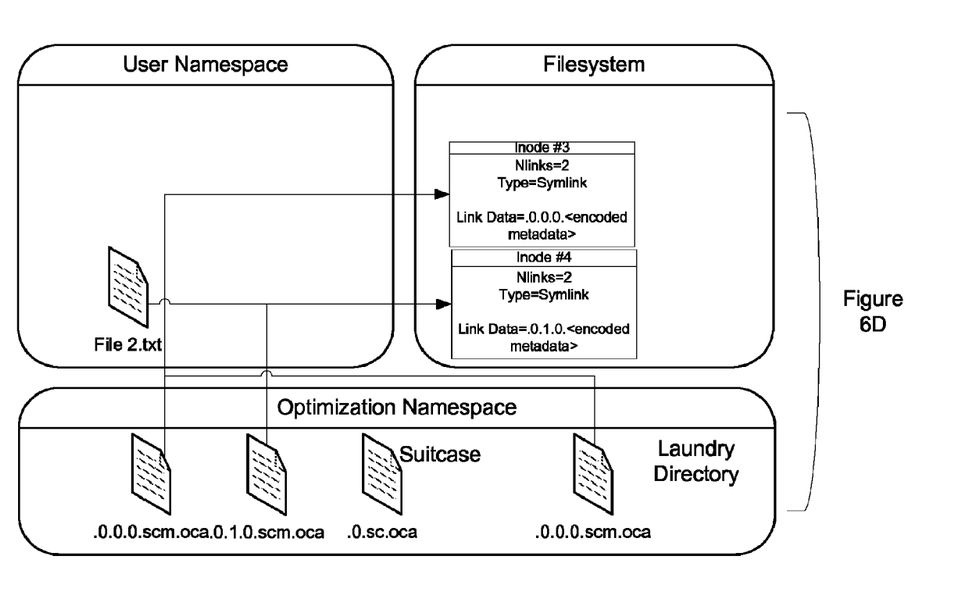
Figure 6E:
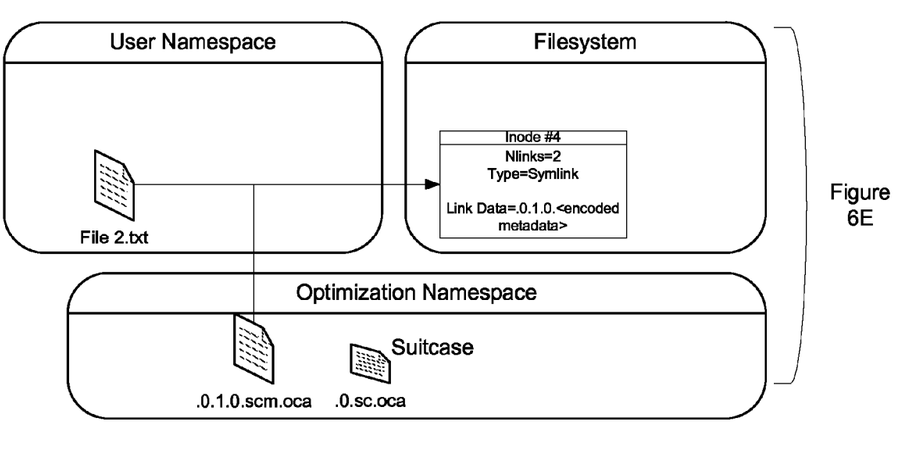
Figure 7:
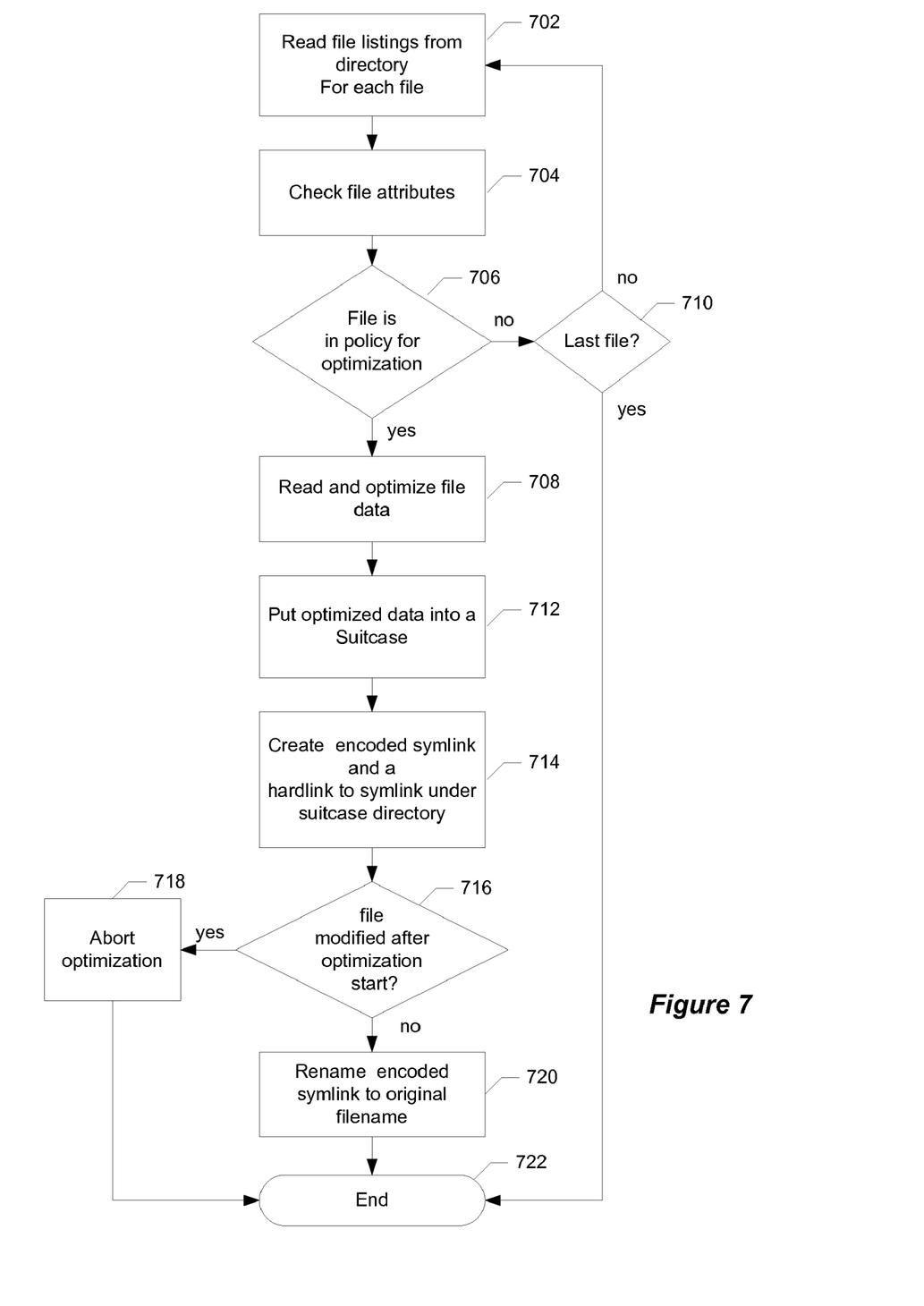
FIG. 7 illustrates a particular example of file optimization.
Figure 8:
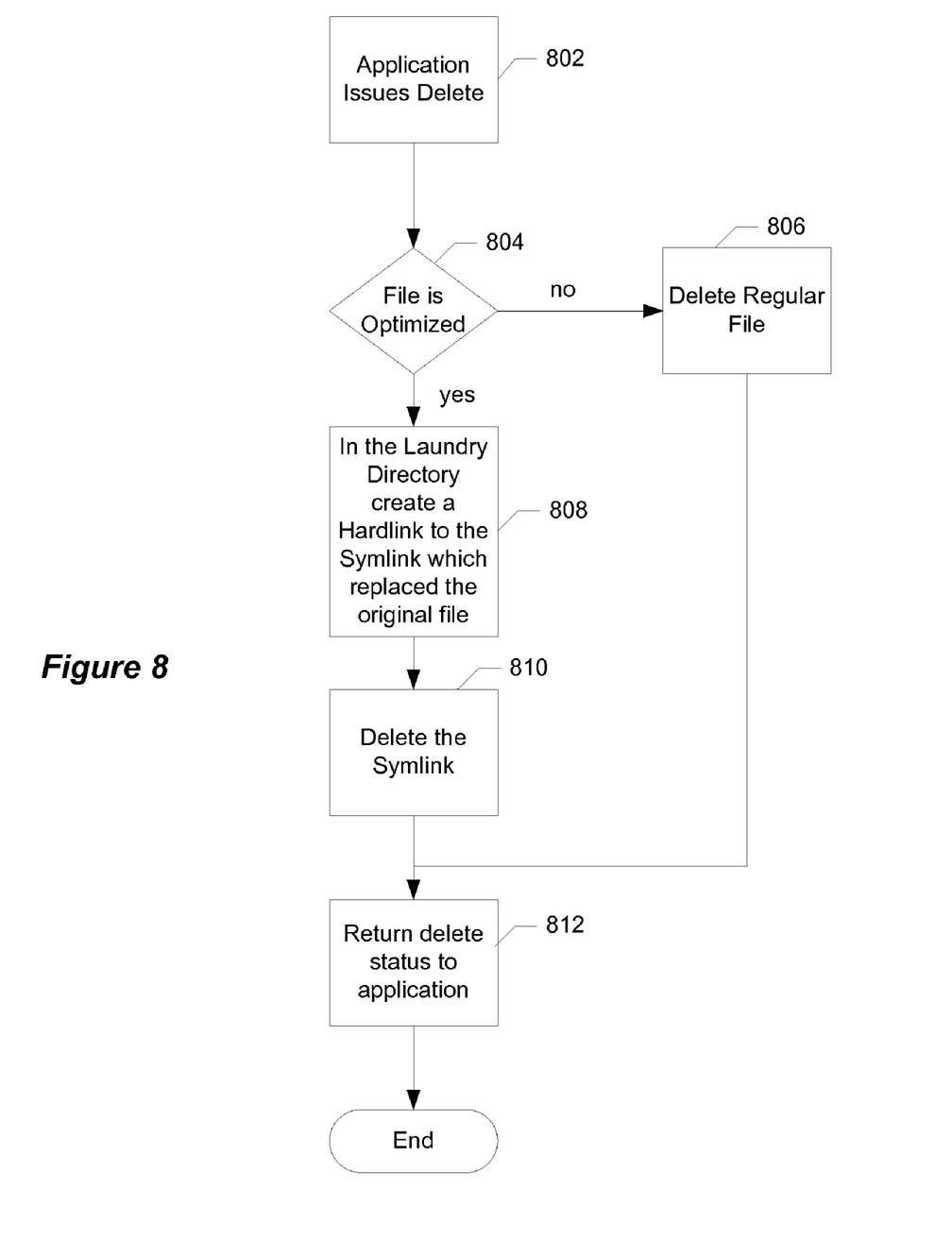
FIG. 8 illustrates a particular example of file deletion.
Figure 9:
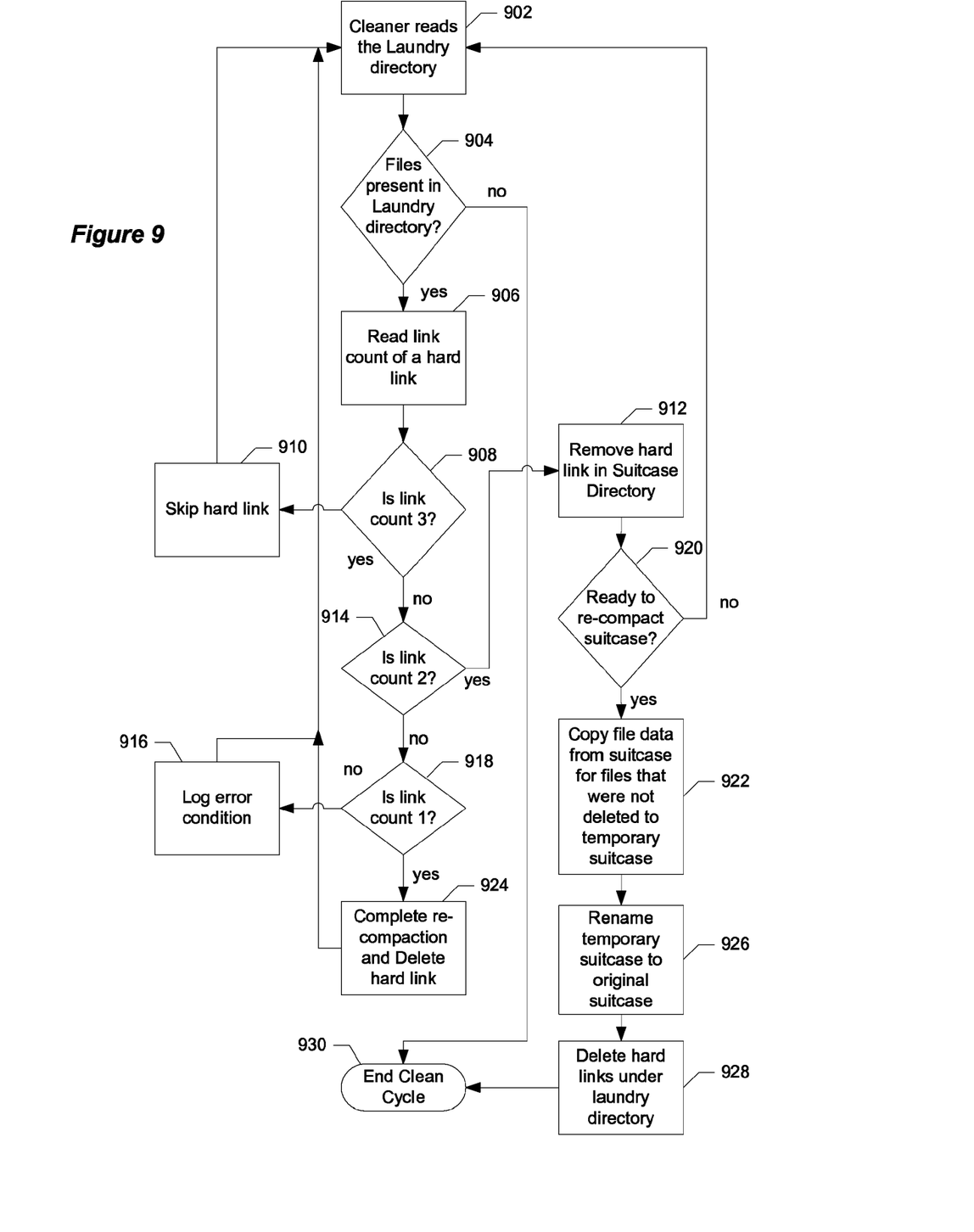
FIG. 9 illustrates a particular example of system cleaning.

FIGS. 6A-6E depicts a graphical representation of a file delete and will be referred to in the description of the flowcharts of FIGS. 7-9. FIG. 7 is a flow chart illustrating a another example of file optimization. In step 702 the system will read file listings for each file from a directory for a given space subject to optimization. In step 704, the system will the check the file attributes of each of the files. In step 706 the system will then determine if the file fits within one or more specified policies for optimization. If it does not, the system will then check to see if it is the last file to check and if so will end, as represented by step 722. If, however, the file does fall within the policy or policies and is to be optimized, the system will then read and optimize the file data, as seen in step 708. FIG. 6A illustrates the relevant files before optimization. Note that there are two files in the user namespace but no symlinks and no hardlinks. In step 712 the system will then put optimized data into a (previously described) suitcase. Then in step 714 the system will create an encoded symlink and a hardlink for the file. The link count for the file will be two (2), one count for the symlink and one count for the hardlink. This link count is used by the cleaner for delete processing, which will be described in greater detail below.

In step 716 the system will check to see if the file has been modified since the start of optimization. If this is the case, the optimization will then be aborted, as seen in step 718. If, however, the file has not been modified since the start of optimization, the system will rename the encoded symlink to the file's original filename in step 720. The original file is thus effectively automatically deleted during the rename operation in step 720, but the data is in the suitcase, which the symlink encoded to have all of the information necessary to retrieve the data from the suitcase. FIG. 6B illustrates the state after step 720. The symlinks have now been renamed over the original files and there is a hardlink to the symlink in the optimization namespace and the original file data is in optimized and stored in a suitcase "0.sc.oca." Note also that the inode numbers have changed from #1 and #2 to #3 and #4 meaning that there are new inodes in the file system.

FIG. 8 is a flow chart illustrating a particular example of file deletion. In step 802 an application issues a delete command for a selected file. In step 804 the system checks to see if the selected file is optimized, and if it is not, it is simply deleted. If however, the selected file is determined to be optimized, the in step 808 the system will, in the laundry directory, create a hardlink to the symlink that replaced the original file. The link count for the symlink is now three (3) for File 1.txt. FIG. 6C illustrates the state after step 808. A hardlink named .0.0.scm.oca has been created in the laundry directory and is hard linked to the symlink File 1.txt. It is named with the same encoding needed to identify the suitcase where the original file data is being held. Then in step 810, the system will delete the symlink. The link count for the symlink is now two (2), with a hard link in the laundry directory for the cleaner to post process, as will be described in FIG. 9. Finally in step 812, the system will return a delete status to the user application. FIG. 6D illustrates the state after step 810. The symlink File 1.txt has been deleted and thus the applications can no longer get to the data. However, the optimized data is still in the suitcase, and the cleaner will remove the data later. Inode #3 is still present because it has two links to it.

FIG. 9 is a flow chart illustrating a particular example of system cleaning. In step 902, the cleaner of the system reads the laundry directory. Then in step 904, the system determines if files are present in the laundry directory. If not then the clean cycle will end, as represented by step 930. If, however, there are files present in the laundry directory, then in step 906, the system will read the link count of each hard link present in the laundry directory. If the link count for a given hardlink is three (3) then the hard link will be skipped, i.e. no cleanup action will be performed, as a count of three (3) indicates that there is still a reference to the symlink, and that the symlink and the file data in the suitcase should not be deleted. If the link count is two (2) as determined in step 914, in step 912 the system will remove the hard link in the suitcase directory. After removing the hardlink, the link count is now one (1). If the system were to crash, when the system returns to operation and the system (cleaner) finds a link count of one (1) it will know that there was a crash and continue to recompact the suitcase. Then in step 920, the system will determine if it is ready to recompact the suitcase. In one embodiment, the system is determined ready when it has gone though the laundry directory and found all files from a particular suitcase that must be deleted. If the system is not ready it will return to step 902, whereas if it is ready in step 922 the system will copy file data form the suitcase for files that were not deleted to a temporary suitcase. Then in step 926, the system will rename the temporary suitcase to the original suitcase and in step 928 will delete hard links in the laundry directory, and end the clean cycle as represented by step 930. FIG. 6E illustrates the state after step 928 of the cleaning process. The hard links in both the optimizer namespace (suitcase) directory and the laundry directory have been removed. The optimized data has also been removed from the suitcase file. The suitcase file is smaller because it has the data for only one file in it now, File 2.txt.

If however, the link count was determined to be 1, as illustrated in step 918, the system will complete recompaction and delete the hardlink, as seen in step 924, and return to step 902.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    reading file listings from a directory for each file including a first file in the directory;
    determining, using a processor, that the first file falls within a policy calling for the first file to be optimized;
    optimizing data of the first file by using the processor, wherein the optimizing of data of the first file includes placing the optimized data for the first file into a suitcase file, wherein the suitcase file includes index information for accessing the first file;
    creating a symlink and a hardlink to the symlink under a suitcase file directory, wherein the symlink is renamed to an original name of the first file, and wherein the symlink includes a data section that encodes a location of the suitcase file and an index number used to access the index information;
    receiving a delete command for the first file in the directory, wherein the hardlink to the symlink is created in a laundry directory upon receiving the delete command, wherein the laundry directory is a directory that is read during system cleaning to determine whether the hardlink is present and to read a link count of the hard link, wherein a clean cycle ends when there are no hardlinks present in the laundry directory, and wherein the hardlink is removed upon determining that the link count is two, as a link count of two indicates that the symlink is deleted and the optimized data in the suitcase file should be deleted; and
    returning a delete status of the first file to an application.

2. The method of claim 1, wherein the symlink is deleted after the hardlink in the laundry directory is created.

3. The method of claim 1, wherein the hardlink is skipped upon determining that the link count is three, as a count of three indicates that there is still a reference to the symlink and that the symlink and the optimized data in the suitcase file should not be deleted.

4. The method of claim 1, where an error is logged upon determining that the link count is one.

5. A non-transitory computer readable storage medium storing instructions which, when executed, causes a computer to perform:
    reading file listings from a directory for each file including a first file in the directory;
    determining, using a processor, that the first file falls within a policy calling for the first file to be optimized;
    optimizing data of the first file, by using the processor, wherein the optimizing of the data of the first file includes placing the optimized data for the first file into a suitcase file, wherein the suitcase file includes index information for accessing the optimized data associated with the first file;
    creating an symlink and a hardlink to the symlink under a suitcase file directory, wherein the symlink is renamed to an original name of the first file, and wherein the symlink includes a data section that encodes a location of the suitcase file and an index number used to access the index information;
    receiving a delete command for the first file in the directory, wherein the hardlink to the symlink is created in a laundry directory upon receiving the delete command, wherein the laundry directory is a directory that is read during system cleaning to determine whether the hardlink is present and to read a link count of the hard link, wherein a clean cycle ends when there are no hardlinks present in the laundry directory, and wherein the hardlink is removed upon determining that the link count is two, as a link count of two indicates that the symlink is deleted and the optimized data in the suitcase file should be deleted; and
    returning a delete status of the first file to an application.

6. The non-transitory computer readable storage medium of claim 5, wherein the symlink is deleted after the hardlink in the laundry directory is created.

7. The non-transitory computer readable storage medium of claim 5, wherein the hardlink is skipped upon determining that the link count is three, as a count of three indicates that there is still a reference to the symlink and that the symlink and the optimized data in the suitcase file should not be deleted.

8. The non-transitory computer readable storage medium of claim 5, where an error is logged upon determining that the link count is one.

9. A system comprising:
    a storage interface operable to read file listings from a directory for each file including a first file in the directory;

a processor operable to:
   determine that the first file falls within a policy calling for the first file to be optimized, optimizing data of the first file wherein the optimizing of data of the first file includes placing the optimized data for the first file into a suitcase file, wherein the suitcase file includes index information for accessing the first file;
   create a symlink and a hardlink to the symlink under a suitcase file directory, wherein the symlink is renamed to an original name of the first file, and wherein the symlink includes a data section that encodes a location of the suitcase file and an index number used to access the index information; and
an input interface operable to receive a delete command for the first file in the directory and return a delete status of the first file to an application, wherein the hardlink to the symlink is created in a laundry directory upon receiving the delete command, wherein the laundry directory is read during system cleaning to determine whether the hardlink is present and to read a link count of the hard link, wherein a clean cycle ends if there are no hardlinks present in the laundry directory, wherein the hardlink is removed upon determining that the link count is two, as a link count of two indicates that the symlink is deleted and the optimized data in the suitcase file should be deleted.

10. The system of claim 9, wherein the symlink is deleted after the hardlink in the laundry directory is created.

11. The system of claim 9, wherein the hardlink is skipped upon determining that the link count is three, as a count of three indicates that there is still a reference to the symlink and that the symlink and the optimized data in the suitcase file should not be deleted.

12. The system of claim 9, where an error is logged upon determining that the link count is one.

* * * * *